United States Patent
Syrjarinne

(10) Patent No.: US 10,732,288 B2
(45) Date of Patent: Aug. 4, 2020

(54) ENHANCED USE OF SATELLITE NAVIGATION SYSTEM RELATED DATA

(71) Applicant: HERE Global B.V., Eindhoven (NL)

(72) Inventor: Jari Tapani Syrjarinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 304 days.

(21) Appl. No.: 15/633,993

(22) Filed: Jun. 27, 2017

(65) Prior Publication Data

US 2018/0372876 A1    Dec. 27, 2018

(51) Int. Cl.
| | |
|---|---|
| *G01S 19/05* | (2010.01) |
| *G01S 19/21* | (2010.01) |
| *H04L 29/06* | (2006.01) |
| *H04W 12/10* | (2009.01) |

(52) U.S. Cl.
CPC ............ *G01S 19/05* (2013.01); *G01S 19/215* (2013.01); *H04L 63/12* (2013.01); *H04W 12/10* (2013.01)

(58) Field of Classification Search
None
See application file for complete search history.

(56) References Cited

U.S. PATENT DOCUMENTS

| | | | |
|---|---|---|---|
| 8,370,629 B1 | 2/2013 | Ngo et al. | |
| 8,948,392 B2 | 2/2015 | Chassagne | |
| 9,217,792 B2 | 12/2015 | Wu | |
| 9,467,293 B1 | 10/2016 | Brainard | |
| 9,470,796 B2 | 10/2016 | Jantz et al. | |
| 2003/0171860 A1 | 9/2003 | Fan | |
| 2008/0080712 A1 | 4/2008 | Huang | |
| 2009/0124267 A1 | 5/2009 | Del Castillo | |
| 2009/0215467 A1 | 8/2009 | Shim et al. | |
| 2010/0007554 A1 | 1/2010 | Wang et al. | |

(Continued)

FOREIGN PATENT DOCUMENTS

| | | |
|---|---|---|
| DE | 112015000695 T5 | 2/2014 |
| EP | 2397868 A1 | 12/2011 |

(Continued)

OTHER PUBLICATIONS

Baldini et al.: "Robust GNSS Services for Road Transportation", European Union 2016 (http://publications.jrc.ec.europa.eu/repository/bitstream/JRC104649/robust_gnss_v10_onlinecorrect.pdf).

(Continued)

*Primary Examiner* — Whitney Moore
(74) *Attorney, Agent, or Firm* — Lempia Summerfield Katz LLC

(57) ABSTRACT

A system obtains navigation data for Galileo from at least one terrestrial apparatus. The obtained navigation data corresponds to navigation data transmitted by a Galileo satellite. The system assembles assistance data comprising navigation data for Galileo and further data in an interrelated manner such that a message authentication codes (MACs) included for the navigation data for Galileo is usable for verifying authenticity of the further data as well. The system transmits the information to a device, which verifies the authenticity of the included navigation data for Galileo based on the MACs. Only in case the navigation data for Galileo in the assistance data is determined to be authentic, it considers the further data to be authentic.

18 Claims, 5 Drawing Sheets

---

Receive information from a source other than satellites, wherein the received information comprises navigation data for Galileo and further data in an interrelated manner and at least one message authentication code for the navigation data for Galileo, the navigation data corresponding to navigation data transmitted by a satellite of Galileo. — 401

Verify the authenticity of the navigation data for Galileo in the received information based on the at least one message authentication code. — 402

In case the navigation data for Galileo in the received information is determined not to be authentic, discard the navigation data and the further data in the received information. — 403

In case the navigation data for Galileo in the assistance data is determined to be authentic, consider the further data as being authentic. — 404

(56) References Cited

U.S. PATENT DOCUMENTS

| | | | |
|---|---|---|---|
| 2011/0296184 | A1 | 12/2011 | Tran |
| 2013/0176168 | A1 | 7/2013 | Lo et al. |
| 2013/0251150 | A1* | 9/2013 | Chassagne ............. G01S 1/042 380/270 |
| 2014/0327541 | A1 | 11/2014 | Ani |
| 2014/0351576 | A1 | 11/2014 | Enge et al. |
| 2016/0154106 | A1 | 6/2016 | Fernandez-Hernandez |
| 2017/0031027 | A1* | 2/2017 | Jantz ...................... G01C 21/00 |
| 2017/0031028 | A1 | 2/2017 | Fernandez Hernandez |
| 2017/0188197 | A1 | 6/2017 | Finlow-bates |

FOREIGN PATENT DOCUMENTS

| | | | |
|---|---|---|---|
| EP | 2708917 | A1 | 3/2014 |
| EP | 2746810 | A1 | 6/2014 |
| EP | 2770340 | A1 | 8/2014 |
| EP | 2799908 | A1 | 11/2014 |
| WO | WO2015164609 | A1 | 10/2015 |

OTHER PUBLICATIONS

European GNSS Agency (GSA): "Development, Supply and Testing of a Galileo Open Service Authentication User Terminal (OS-NMA) for the GSA"; Annex I to Invitation to Tender 'Tender Specifications', Ref: GSA/OP/23/16/Annex I, Issue: 1, Date: Jan. 27, 2016 (https://www.gsa.europa.eu/development-supply-and-testing-galileo-open-service-authentication-user-terminal-os-nma-gsa).

Fernández-Hernández et al.; "A Navigation Message Authentication Proposal for the Galileo Open Service", NAVIGATION: Journal of The Institute of Navigation, vol. 63, No. 1, Spring 2016 (http://spcomnav.uab.es/docs/journals/Navigation-FERNANDEZ2016.pdf).

HERE Positioning: Find out where you are, with or without GPS (https://here.com/en/products-services/products/here-positioning) Apr. 24, 2017.

Walker et al.: "Galileo Open Service Authentication: a Complete Service Design and Provision Analysis", Conference Paper Sep. 2015 (http://www.galileocsdemo.eu/wpcontent/uploads/2017/02/2015-ion-osnmawalker-iongnss2015.pdf).

Wesson et al.; University of Texas at Austin: "Practical Cryptographic Civil Gps Signal Authentication" (https://radionavlab.ae.utexas.edu/images/stories/files/papers/nma.pdf), Feb. 2012.

PCT International Search Report and Written Opinion of the International Searching Authority dated Aug. 3, 2018 for corresponding PCT/EP2018/067024.

Open Mobile Alliance. "User Plane Location Protocol." Draft Version 2 (2007): 1-406.

Hein, Guenter, et al. "Authenticating GNSS: proofs against spoofs, Part 2." Inside GNSS 2.5 (2007): 58-63.

Lytvyn, Mykhailo, Albert Kemetinger, and Philipp Berglez. "How can an orbit prediction module speed up the TTFF and help to authenticate the position?." Satellite Navigation Technologies and European Workshop on GNSS Signals and Signal Processing,(NAVITEC), 2012 6th ESA Workshop on. IEEE, 2012.

PCT International Search Report and Written Opinion of the International Searching Authority dated Sep. 27, 2018 for corresponding PCT/EP2018/067018.

* cited by examiner

| Information | Description | Benefit |
|---|---|---|
| Reference Time | Initial Time within 3 s from NTP | Sensitivity Improvement |
| Reference Location | Initial Location from Cell or Wi-Fi | Sensitivity and TTFF improvement |
| GNSS System Time Differences | GNSS System Time Differences | Sensitivity and TTFF improvement |
| Almanac Data | BC Almanac Data specific per GNSS | TTFF improvement |
| Ephemeris Data | BC Ephemeris Data incl. clock model | TTFF improvement |
| Auxiliary Info | GLONASS Frequency allocations | TTFF improvement |
| RT Integrity | Real-time satellite signal Status | Reliability improvement |
| Predicted Integrity | GNSS outages and Future Availability | Reliability improvement |
| Ionospheric Model | BC Ionospheric Model specific per GNSS | Accuracy improvement |
| Time Model | BC UTC Model specific per GNSS | Conversion from GNSS time(s) to UTC time |
| Trusted Service | Message authentication codes | Data validation for trusted services |

BC: Broadcast
NTP: Network Time Protocol
TTFF: Time to First Fix
UTC: Coordinated Universal Time

FIG. 7

ENHANCED USE OF SATELLITE NAVIGATION SYSTEM RELATED DATA

FIELD OF THE DISCLOSURE

The disclosure relates to the field of positioning and more specifically to an enhanced use of satellite navigation system related data, for instance assistance data for satellite navigation systems.

BACKGROUND

Global navigation satellite systems (GNSS) are the backbones of positioning and navigation solutions. It has been estimated that the total number of GNSS receivers in the markets has exceeded 4 billion units by the end of 2016. A GNSS receiver (e.g. in the form of a chipset) can be found in every smartphone, smartwatch, new car, high-end drone etc. The volumes are still rapidly growing due to the GNSS integration into Internet of Things (IoT) devices.

It is commonly known that a standalone GNSS receiver does not work satisfactorily in urban areas and it also has certain fundamental bottlenecks in its performance that make it non-ideal e.g. for mass market devices and their use cases. GNSS was originally aimed for outdoor (and continuous signal reception) use only, hence the GNSS signals and the data link from the satellites to the receiver were not designed for weak signal conditions nor to the fastest possible time-to-first-fix. Also, the fact that the satellites are far in the space (at an altitude of 20,000 km) and solar-powered means that no engineering effort will be enough to overcome the physical limitations related to limited transmission power and to the radio propagation loss. Solutions to improve the performance of GNSS receivers need to found on other technologies and radios.

Cellular operators and mobile phone manufactures started to develop GNSS assistance data services roughly 20 years ago, to find a solution for the mentioned GNSS performance gaps. It was discovered that the ranging signal transmitted from the satellites was still strong enough in urban environments to be received with the novel high-sensitivity GNSS receivers, but the navigation data interleaved with the ranging signals become too noisy and erroneous for successful demodulation. (Navigation data contains the satellite orbit and clock parameters among other constellation status info, which are essential for position calculation.) Hence, a solution capable of capturing the satellite navigation data and transmitting that data via an alternative route to the receivers would drastically improve the performance and make GNSS acceptable even for emergency call positioning. As a result, assisted-GPS (later assisted-GNSS, A-GNSS) technology was created, standardized and adopted for commercial use. Today, all the GNSS receivers in the smartphones are A-GNSS receivers i.e. inherently combining GNSS and terrestrial systems into one positioning technology.

The GNSS family consists of several satellite constellations. The first and most widely used is the system developed and operated by the US Air Forces i.e. Navstar GPS, in short: GPS (global positioning system). GPS has been in operational use since 1980's. The Russian counterpart from the Cold War era is GLONASS, which has now been modernized and offering performance equal to GPS. China is currently building up their own global system called Beidou and the EU is ramping up Galileo. In addition to these four global satellite constellations, there exist also regional augmentation systems (satellite based augmentation systems, SBAS) such as the Japanese quasi-zenith satellite system (QZSS) and multi-functional satellite augmentation system (MSAS), the US wide area augmentation system (WAAS), the European geostationary navigation overlay service (EGNOS), the Indian GPS aided geo augmented navigation (GAGAN) system and the Russian GLONASS system for differential correction and monitoring (SDCM).

GNSS constellations offer open service (OS) signals for the civilian and "unauthorized use", and regulated/military signals for the authority and military use, latter of which typically require a specific receiver or encryption keys to use these signals for positioning (even for reception). On the contrary, the structure and format of the OS signals are publicly known, as the interface control documents (ICD) describing the signals and data transmitted by the satellites are freely available. Also, the OS GNSS receivers are commercially available as modules, development kits etc. so it is relatively easy to get access to the GNSS signals and data, even to replicate the signals with perfect receiver compatibility. This "easiness" and openness has led to the development of numerous malicious devices which can be used to "spoof" the GNSS receivers in various ways: either to make them report false position and/or time, or even totally jam/block the performance. None of the existing GNSS systems have any means to authenticate the signals or data the satellites transmit, and hence efficiently avoid spoofing. The lack of signal/service authentication is a very serious risk for the location based services that use GNSS to validate the location of a device or a user e.g. for charging/transactions (road tolls, parking etc.). Especially, for the smartphone use cases this has been seen as one of the major problems.

SUMMARY OF SOME EMBODIMENTS OF THE INVENTION

An example embodiment of a method according to a first aspect of the invention comprises, performed by at least one device, obtaining navigation data for at least one satellite navigation system from at least one terrestrial apparatus, wherein one of the at least one satellite navigation system is Galileo, the obtained navigation data corresponding to navigation data transmitted by a satellite of Galileo. The method further comprises assembling information comprising navigation data for Galileo and further data in an interrelated manner such that at least one message authentication code included in addition for the navigation data for Galileo is usable at a further device at the same time for verifying authenticity of the navigation data for Galileo and the further data. The method further comprises causing transmission of the information to the further device.

An example embodiment of a first system according to the first aspect comprises means for causing performance of the actions of any embodiment of the method presented for the first aspect. The means may be distributed to one or more devices. Thus, the system may be a single device or an assembly of a plurality of devices or a part of a device.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system according to the first aspect comprises at least one processor and at least one memory including computer program code, the at least one memory and the computer program code configured to, with the at least one processor, cause at least one device at least to perform the actions of any embodiment of the presented method according to the first aspect. The at least one processor and/or the at least one memory may belong to a single device, like a server, or be distributed to several devices.

Any of the described systems may comprise only the indicated components or one or more additional components, like a data interface. Any of the described systems may be a device, be a part of a device or be composed of a plurality of devices.

An example embodiment of a method according to a second aspect comprises receiving information from a source other than satellites, wherein the received information comprises navigation data for Galileo and further data in an interrelated manner and at least one message authentication code for the navigation data for Galileo, the navigation data corresponding to navigation data transmitted by a satellite of Galileo. The method further comprises verifying the authenticity of the navigation data for Galileo in the received information based on the at least one message authentication code. In case the navigation data for Galileo in the received information is determined not to be authentic, the method further comprises discarding the navigation data in the received information. In case the navigation data for Galileo in the received information is determined to be authentic, the method further comprises considering the further data to be authentic. The method may be performed by at least one apparatus.

An example embodiment of a first apparatus according to the second aspect comprises means for causing performance of the actions of any embodiment of the method presented for the second aspect.

The means of the apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus according to the second comprises at least one processor and at least one memory including computer program code, the at least one memory and the computer program code configured to, with the at least one processor, cause a device at least to perform the actions of any embodiment of the presented method according to the second aspect.

Any of the described apparatuses may comprise only the indicated components or one or more additional components, like a satellite signal receiver, a data interface, a user interface, etc.

Moreover, an example embodiment of a non-transitory computer readable storage medium, in which computer program code is stored, is presented for the first and second aspect, respectively. In each case, the computer program code causes at least one device to perform the actions of any embodiment of the presented method of the first or second aspect when executed by at least one processor.

In either case, the computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself is considered an example embodiment according to the first or second aspect as well. The computer program code could also be distributed to several computer readable storage mediums.

In certain embodiments, any of the presented methods is an information providing method, and any of the presented first systems is an information providing system and any of the presented first apparatuses is an information providing apparatus. In certain embodiments, the means of the presented first system and/or of the first apparatus are processing means.

In certain embodiments, any of the presented methods is a method for supporting an enhanced use of satellite navigation system related data. In certain embodiments, any of the presented systems is a system for supporting an enhanced use of satellite navigation system related data.

In certain embodiments, any of the presented apparatuses is an apparatus for supporting an enhanced use of satellite navigation system related data.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 7 is a table illustrating example information elements in an example A-GNSS response.

DETAILED DESCRIPTION OF THE FIGURES

Figure 1:
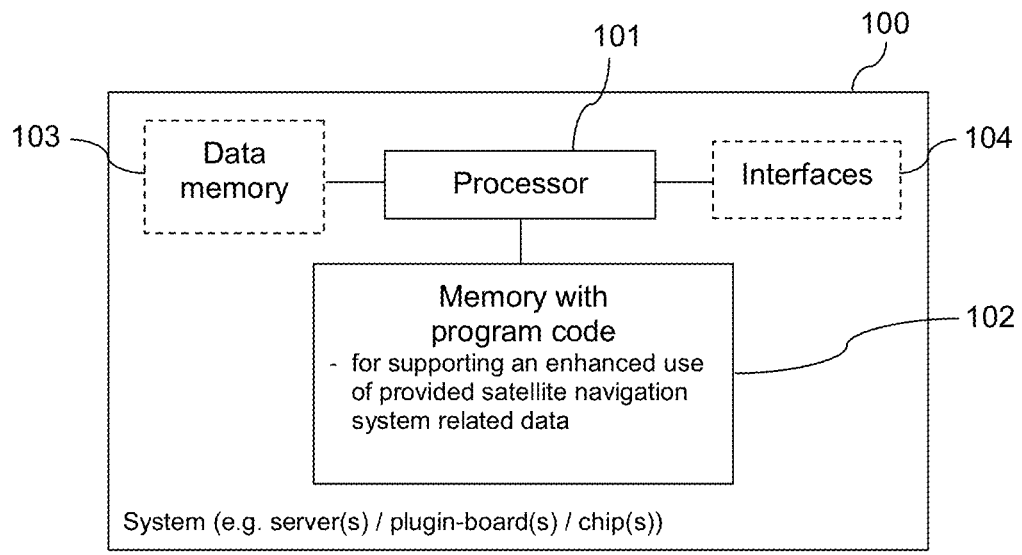
FIG. 1 is a schematic block diagram of an example embodiment of a system according to the first aspect.

FIG. 1 is a schematic block diagram of an example embodiment of a system 100 according to the first aspect. System 100 comprises at least one processor 101 and, linked to the at least one processor 101, at least one memory 102. The at least one memory 102 stores computer program code for supporting an enhanced use of provided satellite navigation system related data. The computer program code may be example computer program code according to the first aspect, and the at least one memory 102 may be an example computer readable medium according to the first aspect. The at least one processor 101 is configured to execute computer program code stored in the at least one memory 102 in order to cause at least one device to perform desired actions.

System 100 may be a device, like a computer/server, or a combination of devices, like computers/servers in the Cloud. System 100 may equally be a module, like a chip, circuitry on a chip or a plug-in board, for a device. Processor 101 may be linked to various other, optional components of system 100, for instance to a data memory 103 and/or to data interfaces 104.

An example operation of system 100 will now be described with reference to the flow chart of FIG. 2. The operation is an example embodiment of a method according to the first aspect. The at least one processor 101 and the program code stored in the at least one memory 102 cause at least one device to perform the operation when program code is retrieved from the at least one memory 102 and executed by the at least one processor 101. It is to be understood that the at least one processor 101 may comprise or have access to at least one working memory for this purpose, for example in the form of a random access memory (not shown). The at least one device that is caused to perform the operation may be or belong to system 100, or comprise system 100.

The at least one device obtains navigation data for at least one satellite navigation system from at least one terrestrial apparatus. One of the at least one satellite navigation system is Galileo. The obtained navigation data corresponds to navigation data transmitted by a satellite of Galileo. (action 201) The at least one terrestrial apparatus may comprise for instance satellite signal receivers, which extract the navigation data from received satellite signals, and/or trusted sources generating navigation data for transmission by satellites. It is to be understood that the expression satellite navigation system may comprise satellite based augmentation systems as well. Accordingly, the expression navigation data is to be understood in a broad sense. With some satellite navigation systems it may refer to augmentation data for other systems.

The at least one device assembles information comprising navigation data for Galileo and further data in an interrelated manner such that at least one message authentication code included in addition for the navigation data for Galileo is usable at a further device at the same time for verifying authenticity of the navigation data for Galileo and the further data. (action 202) The further data may include for instance navigation data for at least one further satellite navigation system and/or other sensitive data.

The at least one device causes transmission of the information to the further device. (action 203) The further device may be for instance a mobile device that needs to determine its own position, or a device that determines the position of mobile devices based on results of measurements on satellite signals provided by the mobile devices.

Figure 3:
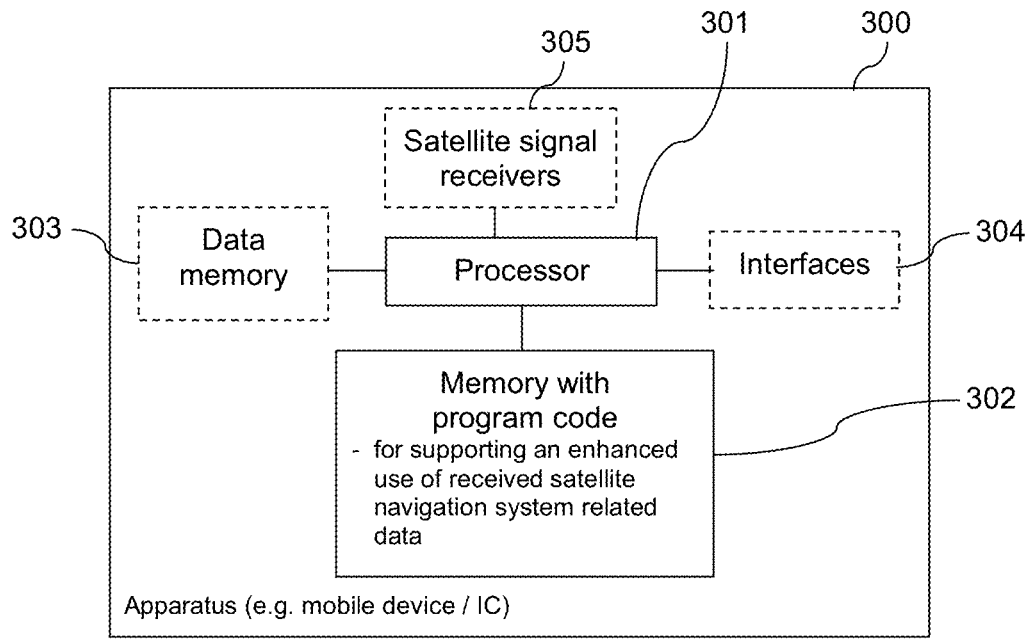
FIG. 3 is a schematic block diagram of an example embodiment of an apparatus according to the second aspect.

FIG. 3 is a schematic block diagram of an example embodiment of an apparatus 300 according to the second aspect. Apparatus 300 comprises at least one processor 301 and, linked to the at least one processor 301, at least one memory 302. The at least one memory 302 stores computer program code for supporting an enhanced use of received satellite navigation system related information. The computer program code may be example computer program code according to the second aspect, and the at least one memory 302 may be an example computer readable medium according to the second aspect. The at least one processor 301 is configured to execute computer program code stored in the at least one memory 302 in order to cause a device to perform desired actions.

Apparatus 300 may be a device, like a handheld mobile user device or an IoT device. Apparatus 300 may equally be a module, like a chip, circuitry on a chip or an integrated circuit, for a device. It could also be or comprise for instance a GNSS chipset. Processor 301 may be linked to various other, optional components of apparatus 300, for instance to a data memory 303, to data interfaces 304, to satellite signal receivers 305 and/or to a user interface.

An example operation of apparatus 300 will now be described with reference to the flow chart of FIG. 4. The operation is an example embodiment of a method according to the second aspect. The at least one processor 301 and the program code stored in the at least one memory 302 cause a device to perform the operation when program code is retrieved from the at least one memory 302 and executed by the at least one processor 301. It is to be understood that processor 301 may comprise or have access to a working memory for this purpose, for example in the form of a random access memory (not shown). The device that is caused to perform the operation may be or belong to apparatus 300, or comprise apparatus 300. The device may be for instance the further device mentioned with reference to FIG. 2.

The device receives information from a source other than satellites. The received information comprises navigation data for Galileo and further data in an interrelated manner and at least one message authentication code for the navigation data for Galileo. The navigation data corresponds to navigation data transmitted by a satellite of Galileo. (action 401) The navigation data provided by the source other than satellites may originate from a satellite or from some other trusted source. The source other than satellites may be for instance a server that may optionally belong to a network of servers. Again, the further data may include for instance navigation data for at least one further satellite navigation system and/or other sensitive data.

The device verifies the authenticity of the navigation data for Galileo in the received information based on the at least one message authentication code. (action 402)

In case the navigation data for Galileo in the received information is determined not to be authentic, the device discards the navigation data and the further data in the received information. (action 403) That is, not only the navigation data for Galileo but all potentially sensitive data is discarded. In case message authentication codes for navigation data for several Galileo satellites are included in the received information, all potentially sensitive data may be discarded in case the navigation data for one of the Galileo satellites is determined not to be authentic. Alternatively, in this case only the authenticated Galileo navigation data may be used, while all other potentially sensitive data is discarded.

In case the navigation data for Galileo in the received information is determined to be authentic, the device considers the further data as authentic as well. (action 404)

The European Galileo system is the youngest member in the GNSS family. The ICD specification and hence the signals/data have not yet been completely defined leaving an opportunity to introduce "add-on features" to the Galileo OS, even to the existing satellites in the constellation.

The European GNSS Agency (GSA) introduced in 2016 a plan to add a method for Navigation Message Authentication (NMA) to the Galileo OS signals aka OS-NMA. The OS-NMA may be taken into testing use in late 2018/early 2019 leading to a full operational implementation within few coming years. The exact details of the Galileo OS-NMA may be introduced in 2018 in an updated version of Galileo OS ICD. The main principles of the coming OS-NMA feature may include:

- OS-NMA will authenticate only the Navigation Data transmitted by the satellites, not the ranging signal.
- OS-NMA will be included in all the satellites.
- OS-NMA will be backwards compatible using some of the "reserved bits" in the current Navigation Data specification.
- OS-NMA will use GNSS system time as one of the inputs to create a message authentication codes (MAC).
- Receivers will need at least a public key to decode and validate the authentication codes included in the Navigation Data. If the message authentication code (MAC) created by a receiver (via current time) matches with the code sent by the satellite at the given time, the navigation data is accepted by the receiver.

The present embodiments are based on the consideration that A-GNSS services may deliver assistance data for various GNSSs, for instance for all major satellite constellations. However, Galileo is the only GNSS which will provide OS-NMA to enable authentication of transmitted navigation data. Thus, it will only improve the Galileo performance against spoofing and data/signal replay attacks. The other GNSSs are left vulnerable against malicious actions. The present embodiments are also based on the consideration that A-GNSS services may deliver other potentially sensitive data than assistance data as well.

Certain embodiments therefore provide that the Galileo navigation message authentication is extended to a general A-GNSS service. To this end, navigation data for Galileo and further data are assembled and transmitted in such a manner, that it is evident for a receiving device that the data stems from the same reliable source. Thus, if the message authentication code provided with the data confirms to a receiving device authenticity of the Galileo navigation data, the receiving device assumes that also the provided further data is authentic.

While the key management policy or mechanism for the code creation has not yet been published by the GSA, it is to be understood that the generation and verification of Galileo message authentication codes for the approach according to the invention may be implemented for instance in compliance with any future standard relating to Galileo OS-NMA.

Certain embodiments may have the effect that if Galileo assistance data is a part of the information provided by an A-GNSS service, a successful Galileo authentication also authenticates the further data provided in the service. Overall satellite signal based positioning performance may be improved in terms of accuracy, coverage and reliability. As a result, A-GNSS may be suitable for mass market devices, like IoT devices.

Figure 2:
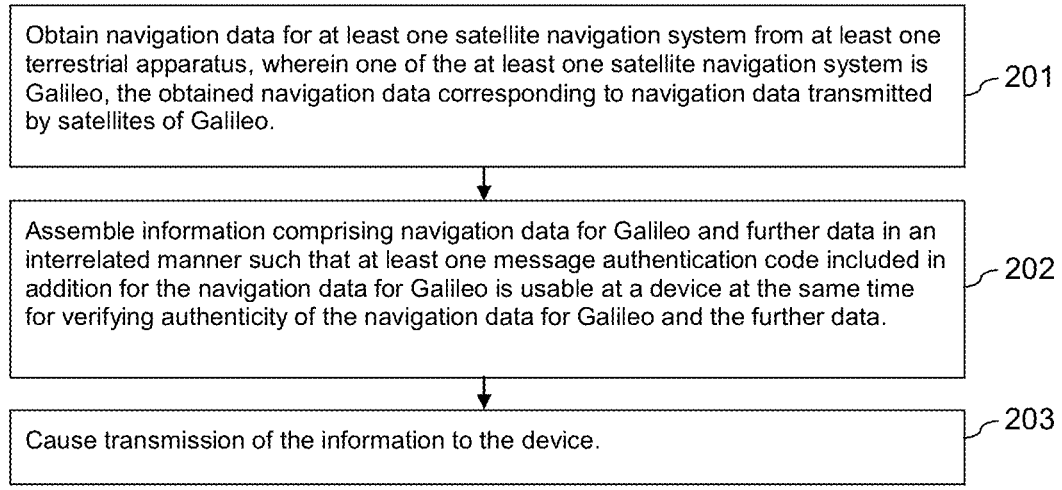
FIG. 2 is a flow chart illustrating an example embodiment of a method according to the first aspect.
Figure 4:
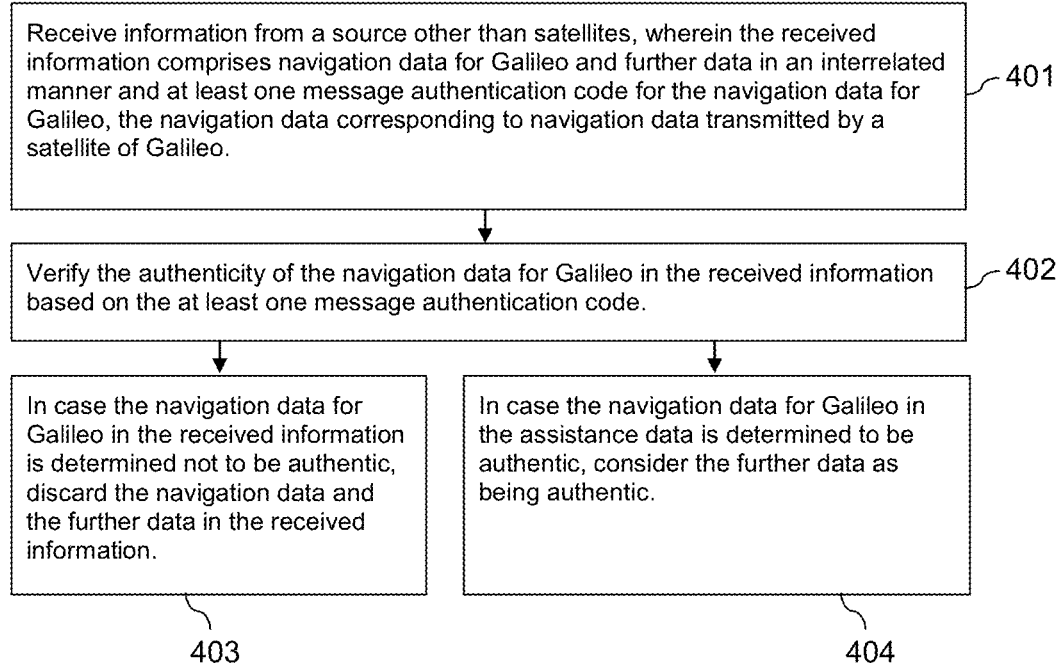
FIG. 4 is a flow chart illustrating an example embodiment of a method according to the second aspect.

System 100 illustrated in FIG. 1 and the method illustrated in FIG. 2 as well as apparatus 300 illustrated in FIG. 3 and the method illustrated in FIG. 4 may be implemented and refined in various ways.

A message authentication code may be determined for instance using at least one function that receives the navigation data and/or a satellite identifier, a key and time information as input. Using time information may provide a protection against replay-attacks.

In an example embodiment of the first aspect, the at least one device receives a request for information from the further device, wherein assembling information comprising navigation data for Galileo and further data in an interrelated manner comprises including the navigation data, the further data and the at least one message authentication code in a coherent response to the request. If data is received in a coherent response to a request, this may indicate to the receiver that if included Galileo navigation data is authentic, also the rest of the included data can be assumed to be authentic, as it is provided by the same source.

In an example embodiment of the first aspect, assembling information comprising navigation data for Galileo and the further data in an interrelated manner comprises one of the following: including the navigation data for Galileo and the further data in a single message; or including the navigation data for Galileo and the further data in a plurality of coherently encrypted messages; or including the navigation data for Galileo and the further data in a single encrypted message; or coherently encrypting the navigation data for Galileo and the further data and inserting the encrypted navigation data and further data in at least one message; or adding a common digital signature for the navigation data for Galileo and the further data. Any of these measures may indicate as well in a reliable manner that the further data has been included in the information by the same entity that included the verifiable navigation data for Galileo.

In an example embodiment of the first aspect, the at least one device may receive the at least one message authentication code for the navigation data for Galileo as well from the at least one terrestrial apparatus. The at least one terrestrial apparatus may receive message authentication codes for navigation data for Galileo that are transmitted by Galileo satellites. Alternatively, the at least one device may receive the at least one message authentication code from an entity of a trusted source creating message authentication codes for navigation data for Galileo. The trusted source may be for instance the GSA.

In an example embodiment of the first aspect, the at least one terrestrial apparatus is at least one apparatus of a global monitoring network collecting data transmitted by satellites of each of the at least one satellite navigation system.

In an example embodiment of either aspect, the further data comprises navigation data for at least one further satellite navigation system; and/or configuration data of the further device; and/or at least one IP-address of a server; and/or at least one certificate; and/or other sensitive information. Configuration data of the further device may indicate for instance GNSS positioning features, constellations, and Quality of Service (QoS) levels being enabled/disabled. It is to be understood that provided information may comprise other data as well, like a key and/or a digital signature.

In an example embodiment of either aspect, the further data comprises navigation data for at least one further satellite navigation system, and the at least one further satellite navigation system comprises at least one of: the global positioning system and/or GLONASS and/or Beidou and/or at least one satellite based augmentation system. The at least one satellite based augmentation system may comprise for instance QZSS, WAAS, EGNOS, MSAS, GAGAN and/or SDCM. It is to be understood that any combination of these systems may be supported and that any other or future satellite navigation systems may be supported alternatively or in addition. Authenticated navigation data for Galileo and for at least one further satellite navigation system may be used at the further device receiving the information for position and/or time computations. The position computations may be position computations for the further device itself or for some other device, which provides results on measurements on satellite signals. The time and/or positioning computations at a device receiving assistance data may become the more reliable, if navigation data for more satellite navigation systems is provided as assistance data. It is to be understood that the navigation data that is actually included in provided information may take into account the location and/or the capabilities of the receiving further device. For instance, navigation data for local satellite navigation systems is only useful for a receiving device, if the receiving device is located in a corresponding region. Also for global satellite systems, only navigation data for satellites that are visible at the approximate current location of the receiving further device may be included.

Figure 5:
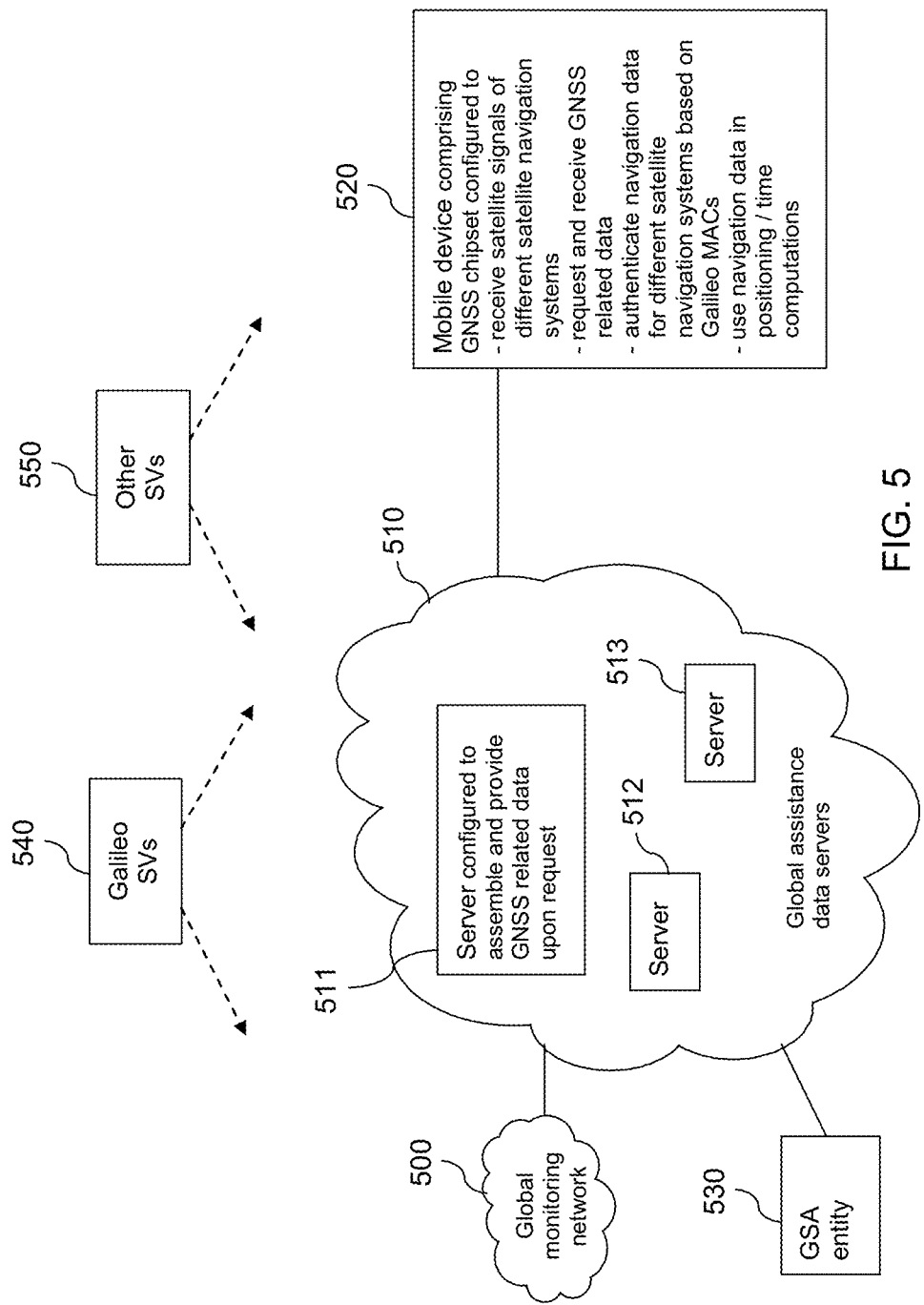
FIG. 5 is a schematic block diagram of an example embodiment of a system.

FIG. 5 is a schematic block diagram of an example embodiment of a system supporting an enhanced use of satellite navigation system related data. By way of example, the satellite navigation system related data is assumed to be positioning assistance data, which may be supplemented with further sensitive data.

The system comprises a global monitoring network 500, global assistance data servers 510, a mobile device 520, and optionally a GSA entity 530. Satellites (or space vehicles SV) 540, 550 of different satellite navigation systems broadcast satellite signals, which include navigation data.

The satellites include Galileo satellites 540 as well as satellites 550 of at least one further satellite navigation system, including for instance GPS, GLONASS, Beidou, QZSS and one or more other SBAS.

The global monitoring network 500 comprises monitoring receivers that are configured to receive satellite signals from respectively visible satellites 540 and 550. The monitoring receivers are configured to extract and forward navigation data and associated data from the signals. They may be distributed across the world.

The global assistance data servers 510 comprise a plurality of servers 511, 512, 513, which are distributed across the world as well. Each of the servers is configured to receive data collected by the global monitoring network 500, and to assemble and provide information including GNSS assistance data and optionally further sensitive data upon request of mobile devices 520. Any of servers 511-513 by themselves or in combination may correspond to system 100 of FIG. 1 and include corresponding components. In this case, interfaces 104 may enable a data communication with the global monitoring network 500, GSA entity 530 and mobile devices 520, for instance via the Internet; and data memory 103 may enable storage of any data that is used for assembling assistance data. It is to be understood that the functions of the global assistance data servers 510 may also be performed in the cloud in a distributed manner.

The global monitoring network 500 is linked to the global assistance data servers 510. The connections are safe and secured by VPN and encryption.

GSA entity 530 may be configured to generate MACs for respective instances in time and the keys used for generating the MACs. It may optionally be linked to the global assistance data servers 510 via a safe connection as well.

Mobile device 520 may be any device that is configured to move around and that is expected to be able to determine its own position. It may be for instance a smartphone, a smart watch, a tablet PC, an IoT device or any other mobile device, including industrially used devices. Mobile device 520 may correspond to the apparatus 300 of FIG. 3 and include corresponding components. In this case, interfaces 304 may enable a data communication with the global assistance data servers 510 via a radio link that is used for accessing the Internet; and data memory 303 may enable storage of any data that is used for processing satellite and GNSS related data, including GNSS assistance data. Mobile device 520 comprises a GNSS chipset (including for instance processor 301, memory 302 and GNSS receivers 305 of FIG. 3). With the GNSS chipset, mobile device 520 is configured to receive signals from satellites 540, 550 of different satellite navigation systems. A-GNSS service is an integral part of the GNSS chipset. It is configured to accept navigation data and MACs from other sources than direct satellite broadcasts, namely from an A-GNSS service, as well. This may be achieved by a minor software/firmware modification. Mobile device 520 is configured to request, receive and process assistance data.

Figure 6:
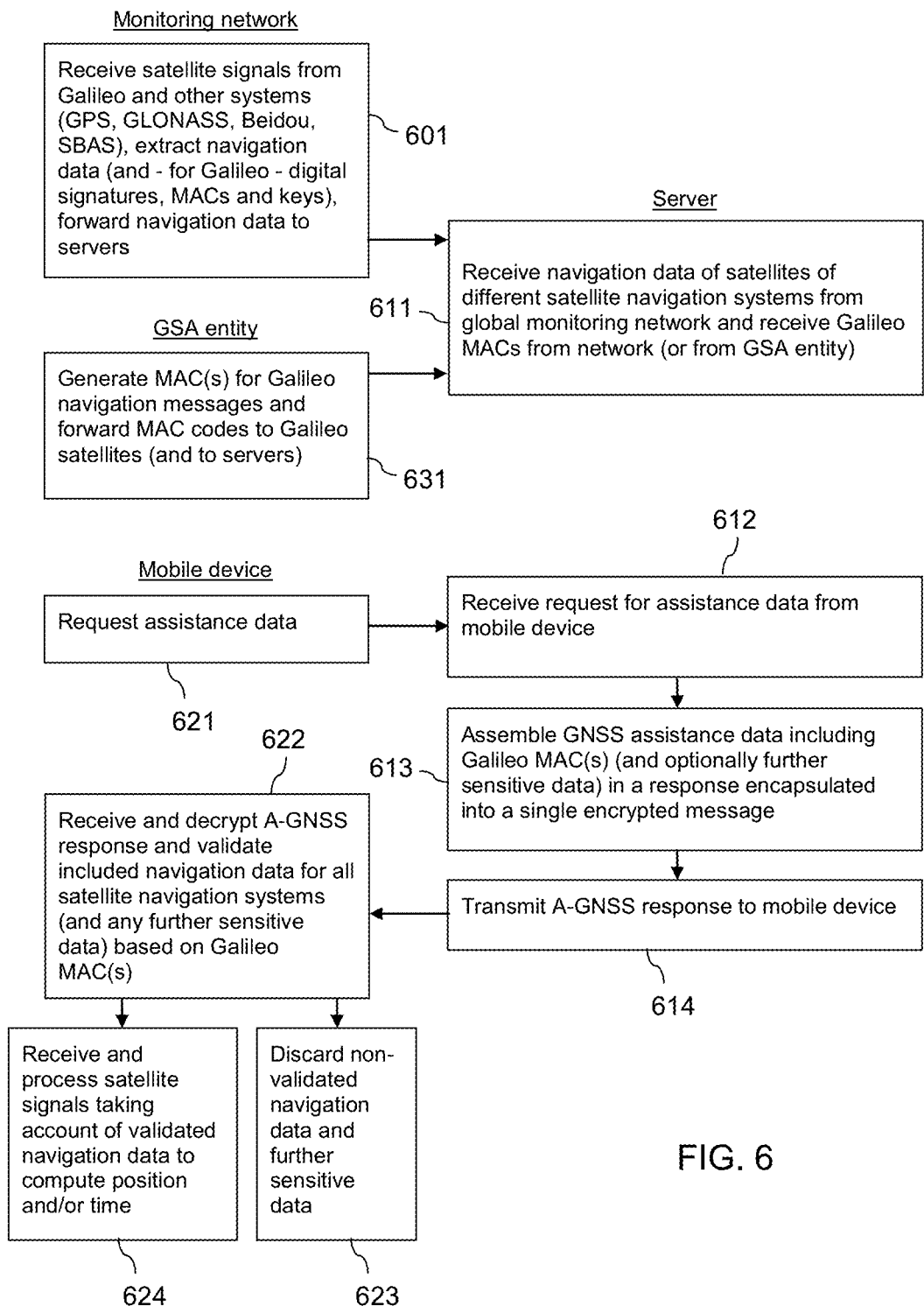
FIG. 6 is a flow chart illustrating an example embodiment of operations in the system of FIG. 5.

FIG. 6 is a flow chart illustrating first example operations in the system of FIG. 5. Server 511 is caused to perform the actions presented on the right hand side. Monitoring network 500, GSA entity 530 and Mobile device 520 are caused to perform the actions presented on the left hand side.

Monitoring receivers of the global monitoring network 500 receive signals from satellites 540, 550 of various satellite navigation systems, including Galileo. The monitoring receivers extract navigation data and associated data. The harvested navigation data contains real-time data for all supported satellite navigation systems. Only Galileo has a built-in mechanism for authentication.

Data transmitted by Galileo satellites 540 includes navigation data, digital signatures, MACs and keys. The monitoring receivers may store a public key corresponding to a private key that has been used for encoding and signing at least a part of the received data. The monitoring receivers may decode the encoded data, including a MAC, and verify its source using the public key. Furthermore, if a MAC created by the monitoring receivers (using received keys and a given time) matches with a MAC sent by a satellite at the given time, the associated navigation data is accepted by the monitoring receivers. The navigation data received from other satellites 550 may be accepted with or without further evaluation, depending e.g. on whether a digital signature is included in the message or whether the message is encrypted.

The generation and use of MACs may comply with the planned Galileo standard, which still has to be defined.

One option has been described by Fernández-Hernández, Rijmen, Seco-Granados, Simon, Rodríguez and Calle in "A Navigation Message Authentication Proposal for the Galileo Open Service" in Navigation: Journal of the Institute of Navigation, Vol. 63, No. 1, Spring 2016, pages 85-102. It makes use of a Time Efficient Stream Loss-tolerant Authentication (TESLA) protocol. TESLA is based on the transmission of a MAC to authenticate the plaintext message and the delayed transmission of the key used to compute the MAC. This key belongs to a chain generated through a one-way function F. The chain starts with a random seed key, which is secret, and ends with a root key that is public and certified as authentic. GNSS authentication through TESLA could be performed in the following way: The receiver receives the navigation data and the MAC. The receiver later receives a key from which the MAC can be generated. The receiver authenticates the key with a previous key from the chain that is considered authentic, or the root key, by performing function F the required number of times. The receiver re-generates the MAC with the key and the data, which should coincide with the previously received MAC. The generation of the MAC takes account of the navigation data and of the time for which the data is valid. For further details and suggested variations reference is made to the document.

Global monitoring network 500 provides the harvested data to the global assistance data servers 510 using encryption and VPN. (action 601) The data may be provided in the encrypted and digitally signed form as received by the global monitoring network 500, along with any digital signatures, and along with MACs and keys for Galileo.

GSA entity 530 may generate MACs for Galileo navigation data and forward the MACs and associated keys used for generating the MACs to Galileo satellites 540. (action 631) Optionally, the MACs and/or the associated keys may be provided to server 511 as well. In this case, global monitoring network 500 may refrain from transmitting MACs and/or keys in action 601.

Server 511, as an example global assistance data server, receives navigation data of satellites 540, 550 of different satellite navigation systems from global monitoring network 500. The received data may include data from different monitoring receivers of global monitoring network 500. In addition, server 511 receives Galileo MACs and associated keys for the navigation data. The MACs and associated keys may be received as well from global monitoring network 500 as extracted from the satellite signals. Alternatively, in particular if the latency of global monitoring network 500 becomes an issue, server 511 may receive the MACs and associated keys from GSA entity 530 or similar trusted servers. (action 611)

The reception of the data may be a continuous process, so that current navigation data is always available. The data that is received by server 511 from global monitoring network 500 may optionally be limited to data that is provided by monitoring receivers in a specific region.

At some point in time, mobile device 520 may request assistance data. (action 621) The assistance data may be requested for instance for a certain period. This may be the case when mobile device 520 notes poor quality of reception of satellite signals so that there is a risk that signals may be received but that the included navigation data may not be extracted. Or it may be requested on a general basis whenever time and/or positioning computations are required. Optionally, mobile device 520 may actively or implicitly request further sensitive data in addition.

Server 511 receives the request for assistance data from mobile device 520. (action 612)

Thereupon, server 511 assembles GNSS assistance data, including Galileo MAC(s), in a response encapsulated into a single encrypted message. (action 613) The encryption may be based for instance on a private key that is used in common by all global assistance data servers 510. The message may include further data that does not constitute actual GNSS assistance data, for instance digital signatures that have been provided by Galileo satellites 540 and forwarded by global monitoring network 500, configuration data associated with requesting mobile device 520, an IP-address of server 511, certificates, and/or other sensitive data. If the message conveys only assistance data, the assistance data may correspond to the provided and received information according to any embodiment. Otherwise, the provided and received information may correspond to the assistance data and any further data included in the message.

FIG. 7 is a table illustrating information elements, along with description and benefits, that may be repeated for each satellite navigation system in the response. For the OS-NMA, one more information element may be added into the A-GNSS response for message authentication codes, as indicated in the last row of the table. This information element would be used only for Galileo satellites, though.

Server 511 transmits the A-GNSS response to mobile device 520. (action 614)

Server 511 may also transmit any further required information in the same or a subsequent A-GNSS response, for instance the key that was used for generating the MAC(s) and that may have been transmitted by Galileo satellites 540 and forwarded by global monitoring network 500 to server 511.

Mobile device 520 receives the response. It may store a public key corresponding to a private key used by server 511 for encrypting the encrypted A-GNSS message. Mobile device 520 may decode the message using this stored public key.

Mobile device 520 may furthermore store a public key corresponding to the private key that has been used for encoding and signing at least a part of the data included in the message, as previously mentioned with reference to action 601. Mobile device 520 may decode the encoded data, including the MAC(s), and verify its source using the public key. Mobile device 520 then validates authenticity of the included navigation data for all satellite navigation systems and any included further data based on the included MAC(s) for Galileo. (action 622) The MAC(s) may be verified by mobile device 520 for instance by computing MAC(s) based on the navigation data and/or associated satellite identifier(s) for Galileo, the time for which the navigation data is indicated to be valid and a key that is valid for this time, using some implemented function or functions; and by comparing the computed MAC(s) with the received MAC(s). The availability and verification of the employed key may comply with any Galileo standardization that defines the use of MAC(s) for Galileo. In some embodiments, the key for a certain instant of time may be received in a subsequent message from server 511 and be verified based on a reliable root key or a preceding key before it is used for computing the MAC(s).

If the MAC(s) received for Galileo are determined not to be valid, mobile device 520 discards the navigation data and any further sensitive data received in the A-GNSS response for all satellite navigation systems, not only for Galileo. (action 623)

If the MAC(s) received for Galileo are determined to be valid, mobile device 520 considers the navigation data received in the A-GNSS response for all satellite navigation systems and any further received sensitive data to be authentic, not only the navigation data for Galileo. (624) Mobile device 520 may now use the navigation data to compute position and or time. Other included data may be processed as required.

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, it is to be understood that the order of actions presented in FIG. 6 is not necessarily sequential. Server 511 may constantly receive data from network 500 and process requests of mobile devices in parallel.

Summarized, certain embodiments may enable mobile devices to authenticate GNSS assistance data as a whole using Galileo MACs and thus to authenticate all navigation data that is transmitted from servers to the mobile devices as a part of a A-GNSS data response. This allows improving the overall GNSS positioning performance in terms of accuracy, coverage (since navigation data of various systems may potentially be used) and reliability (since, nevertheless, only authenticated navigation data is used).

The following embodiments are also disclosed:

Embodiment 1

A method comprising, performed by at least one device:
obtaining navigation data for at least one satellite navigation system from at least one terrestrial apparatus, wherein one of the at least one satellite navigation system is Galileo, the obtained navigation data corresponding to navigation data transmitted by a satellite of Galileo;
assembling information comprising navigation data for Galileo and further data in an interrelated manner such that at least one message authentication code included in addition for the navigation data for Galileo is usable at a further device at the same time for verifying authenticity of the navigation data for Galileo and the further data; and
causing transmission of the information to the further device.

Embodiment 2

The method according to embodiment 1, comprising receiving a request for information from the further device, wherein assembling information comprising navigation data for Galileo and further data in an interrelated manner comprises including the navigation data, the further data and the at least one message authentication code in a coherent response to the request.

Embodiment 3

The method according to embodiment 1 or 2, wherein assembling information comprising navigation data for Galileo and for the at least one further satellite navigation system in an interrelated manner comprises one of
including the navigation data for Galileo and the further data in a single message; or
including the navigation data for Galileo and the further data in a plurality of coherently encrypted messages; or
including the navigation data for Galileo and the further data in a single encrypted message; or
coherently encrypting the navigation data for Galileo and the further data and inserting the encrypted navigation data and further data in at least one message.

Embodiment 4

The method according to any one of embodiments 1 to 3, wherein the at least one message authentication code for the navigation data for Galileo is received
from the at least one terrestrial apparatus, which receives message authentication codes for navigation data for Galileo in data transmitted by Galileo satellites; or
from an entity of a trusted source creating message authentication codes for navigation data for Galileo.

Embodiment 5

The method according to any one of embodiments 1 to 4, wherein the at least one terrestrial apparatus is at least one apparatus of global monitoring network collecting data transmitted by satellites of each of the at least one satellite navigation system.

Embodiment 6

The method according to any one of embodiments 1 to 5, wherein the further data comprises at least one of:
navigation data for at least one further satellite navigation system; and/or
configuration data of the further device; and/or
an IP-address of at least one server; and/or
at least one certificate; and/or
other sensitive data.

Embodiment 7

The method according to any one of embodiments 1 to 5, wherein the further data comprises navigation data for at least one further satellite navigation system, and wherein the at least one further satellite navigation system comprises at least one of
Global Positioning System; and/or
GLONASS; and/or
Beidou; and/or
at least one satellite based augmentation system.

Embodiment 8

A system comprising at least one apparatus, the at least one apparatus comprising means for causing performance of the actions of the method of any one of embodiments 1 to 7.

Embodiment 9

The system according to embodiment 8, wherein the system is:
a module for a computer; or
a computer; or
a combination of a plurality of computers.

Embodiment 10

A system comprising at least one processor and at least one memory, wherein the at least one memory includes computer program code, the at least one memory and the computer program code configured to, with the at least one processor, cause at least one device at least to:
obtain navigation data for at least one satellite navigation system from at least one terrestrial apparatus, wherein one of the at least one satellite navigation system is Galileo, the obtained navigation data corresponding to navigation data transmitted by a satellite of Galileo;
assemble information comprising navigation data for Galileo and further data in an interrelated manner such that at least one message authentication code included in addition for the navigation data for Galileo is usable at a further device at the same time for verifying authenticity of the navigation data for Galileo and the further data; and
cause transmission of the information to the further device.

Embodiment 11

The system according to embodiment 10, wherein the at least one memory and the computer program code are configured to, with the at least one processor, cause the at least one device to receive a request for information from the further device, and wherein assembling information comprising navigation data for Galileo and further data in an interrelated manner comprises including the navigation data, the further data and the at least one message authentication code in a coherent response to the request.

Embodiment 12

The system according to embodiment 10 or 11, wherein assembling information comprising navigation data for Galileo and further data in an interrelated manner comprises one of
- including the navigation data for Galileo and the further data in a single message; or
- including the navigation data for Galileo and the further data in a plurality of coherently encrypted messages; or
- including the navigation data for Galileo and the further data in a single encrypted message; or
- coherently encrypting the navigation data for Galileo and the further data and inserting the encrypted navigation data and further data in at least one message.

Embodiment 13

The system according to any one of embodiments 10 to 12, wherein the at least one message authentication code for the navigation data for Galileo is received
- from the at least one terrestrial apparatus, which receives message authentication codes for navigation data for Galileo in data transmitted by Galileo satellites; or
- from an entity of a trusted source creating message authentication codes for navigation data for Galileo.

Embodiment 14

The system according to any one of embodiments 10 to 13, wherein the at least one terrestrial apparatus is at least one apparatus of global monitoring network collecting data transmitted by satellites of each of the at least one satellite navigation systems.

Embodiment 15

The system according to any one of embodiments 10 to 14, wherein the further data comprises at least one of:
- navigation data for at least one further satellite navigation system; and/or
- configuration data of the further device; and/or
- an IP-address of at least one server; and/or
- at least one certificate; and/or
- other sensitive data.

Embodiment 16

The system according to any one of embodiments 10 to 14, wherein the further data comprises navigation data for at least one further satellite navigation system, and wherein the at least one further satellite navigation system comprises at least one of
- Global Positioning System; and/or
- GLONASS; and/or
- Beidou; and/or
- at least one satellite based augmentation system.

Embodiment 17

The system according to any of embodiments 10 to 16, wherein the system is:
- a module for a computer; or
- a computer; or
- a combination of a plurality of computers.

Embodiment 18

A computer program code, which is configured to causes at least one device to perform the actions of the methods of any one of embodiments 1 to 7 when executed by at least one processor.

Embodiment 19

A computer readable storage medium in which computer program code is stored, the computer program code causing at least one device to perform the following when executed by at least one processor:
- obtain navigation data for at least one satellite navigation system from at least one terrestrial apparatus, wherein one of the at least one satellite navigation system is Galileo, the obtained navigation data corresponding to navigation data transmitted by a satellite of Galileo;
- assemble information comprising navigation data for Galileo and further data in an interrelated manner such that at least one message authentication code included in addition for the navigation data for Galileo is usable at a further device at the same time for verifying authenticity of the navigation data for Galileo and the further data; and
- cause transmission of the information to the further device.

Embodiment 20

A method comprising, performed by at least one apparatus:
- receiving information from a source other than satellites, wherein the information comprises navigation data for Galileo and further data in an interrelated manner and at least one message authentication code for the navigation data for Galileo, the navigation data corresponding to navigation data transmitted by a satellite of Galileo;
- verifying the authenticity of the navigation data for Galileo in the received information based on the at least one message authentication code;
- in case the navigation data for Galileo in the received information is determined not to be authentic, discarding the navigation data and the further data in the received information; and
- in case the navigation data for Galileo in the received information is determined to be authentic, considering the further data as being authentic.

Embodiment 21

An apparatus comprising means for causing performance of the actions of the method of embodiment 20.

Embodiment 22

The apparatus according to embodiment 21, wherein the apparatus is:
- a user device; and/or
- a mobile device; or
- a module for a device.

Embodiment 23

An apparatus comprising at least one processor and at least one memory, wherein the at least one memory includes computer program code, the at least one memory and the computer program code configured to, with the at least one processor, cause a device at least to:
- receive information from a source other than satellites, wherein the information comprises navigation data for Galileo and further data in an interrelated manner and at least one message authentication code for the navigation data for Galileo, the navigation data corresponding to navigation data transmitted by a satellite of Galileo;
- verify the authenticity of the navigation data for Galileo in the received information based on the at least one message authentication code;
- in case the navigation data for Galileo in the received information is determined not to be authentic, discard the navigation data and the further data in the received information; and
- in case the navigation data for Galileo in the received information is determined to be authentic, consider the further data as being authentic.

Embodiment 24

The apparatus according to embodiment 23, wherein the apparatus is:
- a user device; and/or
- a mobile device; and/or
- a module for a device.

Embodiment 25

A computer program code, which is configured to causes at least one device to perform the actions of the method of embodiment 20 when executed by at least one processor.

Embodiment 26

A computer readable storage medium in which computer program code is stored, the computer program code causing at least one device to perform the following when executed by at least one processor:
- receive information from a source other than satellites, wherein the information comprises navigation data for Galileo and further data in an interrelated manner and at least one message authentication code for the navigation data for Galileo, the navigation data corresponding to navigation data transmitted by a satellite of Galileo;
- verify the authenticity of the navigation data for Galileo in the received information based on the at least one message authentication code;
- in case the navigation data for Galileo in the received information is determined not to be authentic, discard the navigation data and the further data in the received information; and
- in case the navigation data for Galileo in the received information is determined to be authentic, consider the further data as being authentic.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102 can also be viewed as means for obtaining navigation data for at least one satellite navigation system from at least one terrestrial apparatus, wherein one of the at least one satellite navigation system is Galileo, the obtained navigation data corresponding to navigation data transmitted by a satellite of Galileo; means for assembling information comprising navigation data for Galileo and further data in an interrelated manner such that at least one message authentication code included in addition for the navigation data for Galileo is usable at a further device at the same time for verifying authenticity of the navigation data for Galileo and the further data; and means for causing transmission of the information to the further device.

The program code in memory 102 can also be viewed as comprising such means in the form of functional modules.

The functions illustrated by processor 301 in combination with memory 302, can also be viewed as means for receiving information from a source other than satellites, wherein the information comprises navigation data for Galileo and further data in an interrelated manner and at least one message authentication code for the navigation data for Galileo, the navigation data corresponding to navigation data transmitted by a satellite of Galileo; means for verifying the authenticity of the navigation data for Galileo in the received information based on the at least one message authentication code; means for, in case the navigation data for Galileo in the received information is determined not to be authentic, discarding the navigation data and the further data in the received information; and means for, in case the navigation data for Galileo in the received information is determined to be authentic, considering the further data as being authentic.

The program codes in memory 302 can also be viewed as comprising such means in the form of functional modules.

FIGS. 2, 4 and 6 may also be understood to represent example functional blocks of computer program codes supporting enhanced use of assistance data for satellite navigation systems.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method, performed by at least one device, comprising:
   obtaining first navigation data for a first satellite navigation system, the first navigation data corresponding to data transmitted by a satellite of the first satellite navigation system;
   receiving a request, for an assisted global navigation satellite system (A-GNSS) service, from a mobile device;
   assembling information comprising the first navigation data for the first satellite navigation system and second navigation data for a second satellite navigation system such that at least one message authentication code associated with the first navigation data for the first satellite navigation system is usable at the mobile device for verifying authenticity of the first navigation data for the first satellite navigation system and verifying authenticity of the second navigation data for the second satellite navigation system;
   generating a response to the request from the mobile device, wherein the response includes the information comprising the first navigation data, the second navigation data and the at least one message authentication code, wherein the at least one message authentication code is generated using Galileo Open Service Navigation Message Authentication (OS-NMA); and
   causing transmission of the information to the mobile device.

2. The method according to claim 1, wherein assembling information comprising the first navigation data for the first satellite navigation system and the second navigation data for the second satellite navigation system comprises one of
   including the first navigation data and the second navigation data in a single message; or
   including the first navigation data and the second navigation data in a plurality of encrypted messages; or
   including the first navigation data and the second navigation data in a single encrypted message; or
   encrypting the first navigation data and the second navigation data and inserting the encrypted first navigation data and the encrypted second navigation data in at least one message.

3. The method according to claim 1, wherein the at least one message authentication code for the first navigation data is received
   from at least one terrestrial apparatus, which receives message authentication codes for navigation data for Galileo in data transmitted by Galileo satellites; or
   from an entity of a trusted source creating message authentication codes for navigation data for Galileo.

4. The method according to claim 1, wherein the first navigation data is received from at least one apparatus of a global monitoring network collecting data transmitted by satellites of the first satellite navigation system.

5. The method according to claim 1, wherein the information further comprises at least one of:
   configuration data of the mobile device; and/or
   an IP-address of at least one server; and/or
   at least one certificate; and/or
   other sensitive data.

6. The method according to claim 1, wherein the second satellite navigation system comprises at least one of
   Global Positioning System; and/or
   GLONASS; and/or
   Beidou; and/or
   at least one satellite based augmentation system.

7. A system comprising at least one processor and at least one memory, wherein the at least one memory includes computer program code, the computer program code being executable by the at least one processor to cause at least one device to perform operations comprising:
   obtain first navigation data for a first satellite navigation system the first navigation data corresponding to data transmitted by a satellite of the first satellite navigation system;
   receive a request, for an assisted global navigation satellite system (A-GNSS) service, from a mobile device;
   assemble information comprising the first navigation data and second navigation data for a second satellite navigation system such that at least one message authentication code associated with the navigation data is usable at the mobile device for verifying authenticity of the first navigation data for the first satellite navigation system and verifying authenticity of the second navigation data for the second satellite navigation system;

generate a response to the request from the mobile device, wherein the response includes the information comprising the first navigation data, the second navigation data and the at least one message authentication code, wherein the at least one message authentication code is generated using Galileo Open Service Navigation Message Authentication (OS-NMA); and cause transmission of the information to the mobile device.

8. The system according to claim 7, wherein assembling information comprising the first navigation data and the second navigation data comprises one of including the first navigation data and the second navigation data in a single message; or including the first navigation data and the second navigation data in a plurality of encrypted messages; or including the first navigation data and the second navigation data in a single encrypted message; or encrypting the first navigation data and the second navigation data and inserting the encrypted first navigation data and the encrypted second navigation data in at least one message.

9. The system according to claim 7, wherein the at least one message authentication code for the first navigation data is received from at least one terrestrial apparatus, which receives message authentication codes for navigation data for Galileo in data transmitted by Galileo satellites; or from an entity of a trusted source creating message authentication codes for navigation data for Galileo.

10. The system according to claim 7, wherein the first navigation data is received from at least one apparatus of a global monitoring network collecting data transmitted by satellites of the first satellite navigation systems.

11. The system according to claim 7, wherein the information further-comprises at least one of:

configuration data of the further device; and/or an IP-address of at least one server; and/or at least one certificate; and/or other sensitive data.

12. The system according to claim 7, wherein the second satellite navigation system, and wherein the at least one further satellite navigation system comprises at least one of Global Positioning System; and/or GLONASS; and/or Beidou; and/or at least one satellite based augmentation system.

13. The system according to claim 7, wherein the system is:

a module for a computer; or a computer; or a combination of a plurality of computers.

14. A non-transitory computer readable storage medium in which computer program code is stored, the computer program code causing at least one device to perform the following when executed by at least one processor:

obtain first navigation data for a first satellite navigation system, the first navigation data corresponding to data transmitted by a satellite of the first satellite navigation system;

receive a request, for an assisted global navigation satellite system (A-GNSS) service, from a mobile device;

assemble information comprising the first navigation data for the first satellite navigation system and second navigation data for a second satellite navigation system such that at least one message authentication code associated with the first navigation data for the first satellite navigation system is usable at the mobile device for verifying authenticity of the first navigation data for the first satellite navigation system and verifying authenticity of the second navigation data for the second satellite navigation system;

generate a response to the request from the mobile device, wherein the response includes the information comprising the first navigation data, the second navigation data and the at least one message authentication code, wherein the at least one message authentication code is generated using Galileo Open Service Navigation Message Authentication (OS-NMA); and cause transmission of the information to the mobile device.

15. A method performed by at least one apparatus, the method comprising:

receiving information including first navigation data for a Galileo satellite system, second navigation data for another satellite system, and at least one message authentication code for the first navigation data, the first navigation data corresponding to data transmitted by a satellite of the Galileo satellite system and the at least one message authentication code corresponding to Galileo Open Service Navigation Message Authentication (OS-NMA);

verifying the authenticity of the first navigation data in the received information based on the at least one message authentication code;

in case the first navigation data in the received information is determined not to be authentic, discarding the first navigation data and the second navigation data; and in case the navigation data for Galileo in the received information is determined to be authentic, determining the second navigation data to be authentic.

16. An apparatus comprising at least one processor and at least one memory, wherein the at least one memory includes computer program code, the computer program code being executable by the at least one processor to cause at least one device to perform operations comprising:

transmitting a request for an assisted global navigation satellite system (A-GNSS) service, receive, in response to the request, information including first navigation data for a first satellite navigation system, second navigation data for a second satellite navigation system and at least one message authentication code associated with the first navigation data for the first satellite navigation system, the first navigation data corresponding a satellite of the first navigation system and the at least one message authentication code corresponding to Galileo Open Service Navigation Message Authentication (OS-NMA);

verify the authenticity of the first navigation data in the received information based on the at least one message authentication code;

in case the first navigation data in the received information is determined not to be authentic, discard the first navigation data and the second navigation data; and in case the first navigation data in the received information is determined to be authentic, determine the second navigation data to be authentic.

17. An apparatus according to claim 16, wherein the apparatus is:
- a user device; and/or
- a mobile device; and/or
- a module for a device.

18. A non-transitory computer readable storage medium in which computer program code is stored, the computer program code causing at least one device to perform the following when executed by at least one processor:
- transmit a request for an assisted global navigation satellite system (A-GNSS) service;
- receive, in response to the request, information including first navigation data for a first satellite navigation system, second navigation data for a second satellite navigation system and at least one message authentication code associated with the first navigation data for the first satellite navigation system, the first navigation data corresponding a satellite of the first navigation system and the at least one message authentication code corresponding to Galileo Open Service Navigation Message Authentication (OS-NMA);
- verify the authenticity of the first navigation data in the received information based on the at least one message authentication code;
- in case the first navigation data in the received information is determined not to be authentic, discard the first navigation data and the second navigation data; and
- in case the first navigation data in the received information is determined to be authentic, determine the second navigation data to be authentic.

* * * * *